United States Patent
Cason

[15] 3,659,106
[45] Apr. 25, 1972

[54] PORTABLE NEUTRON SOURCE USING A PLURALITY OF MODERATING MEANS

[72] Inventor: John L. Cason, Kennewick, Wash.

[73] Assignee: The United States of America as represented by the United States Atomic Energy Commission

[22] Filed: Sept. 21, 1970

[21] Appl. No.: 73,823

[52] U.S. Cl. .......................... 250/106 S, 250/84.5, 250/86, 250/105, 250/108 R
[51] Int. Cl. ...................................................... G21h 5/00
[58] Field of Search.............. 250/106 R, 106 S, 105, 108 R, 250/84.5, 83.1, 86

[56] References Cited

UNITED STATES PATENTS 3,177,364   4/1965   Green ................................ 250/105

OTHER PUBLICATIONS

Berger; " Some Experiments in Fast Neutron Radiography" Materials Evaluation; December, 1969.
Reinig; " Californium-252: A New Isotopic Source for Neutron Radiography"; Materials Evaluation; March, 1969.

Primary Examiner—Morton J. Frome
Attorney—Roland A. Anderson

[57] ABSTRACT

A portable neutron source uses the isotope $^{252}Cf$ as a source of neutrons. The isotope is mounted in a rotatable cylinder to permit the source to be "turned off". The thickness of the moderator for the neutron source can be varied to change the neutron spectrum. The neutron spectrum can also be varied by heating or cooling the moderator.

7 Claims, 4 Drawing Figures

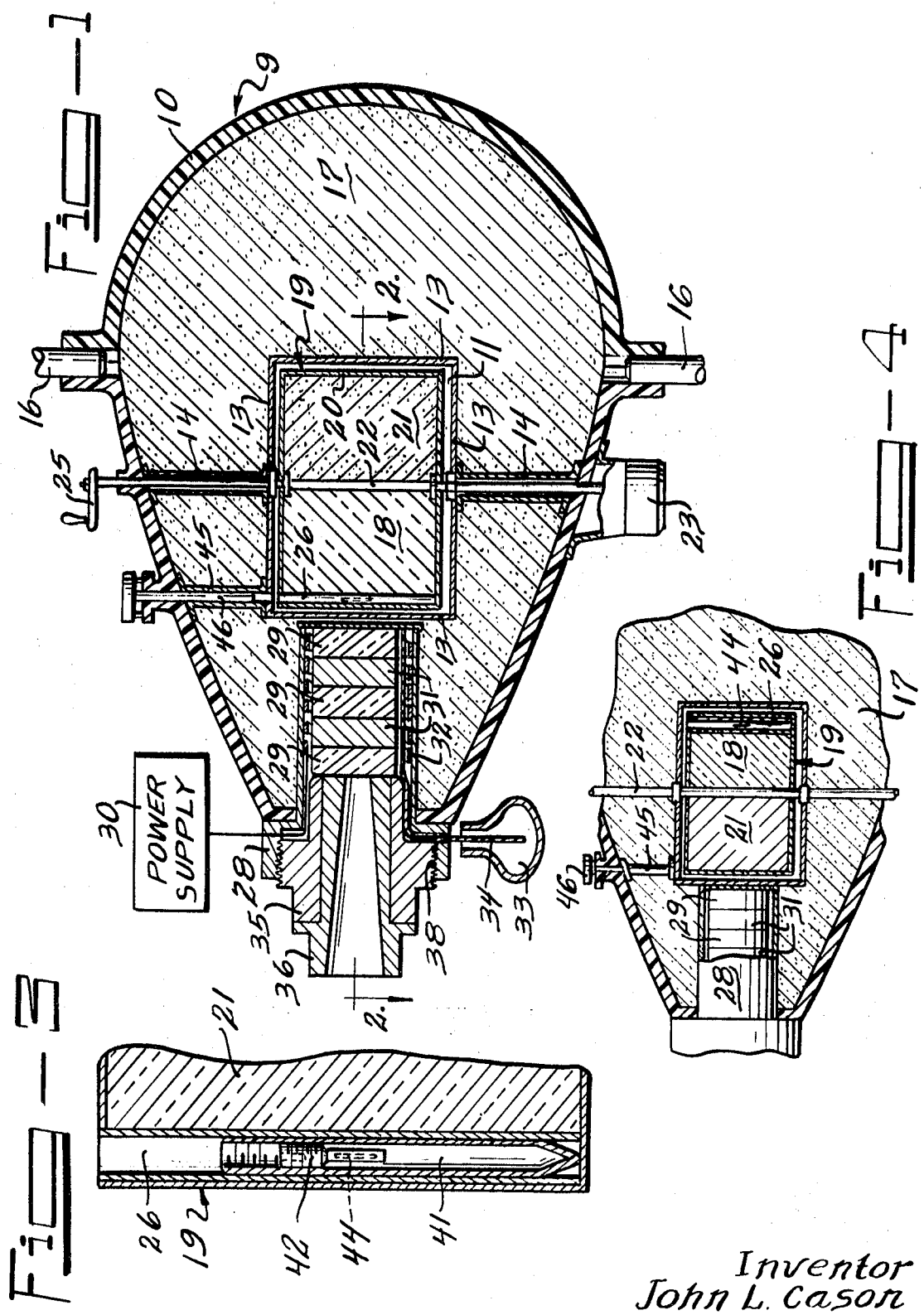

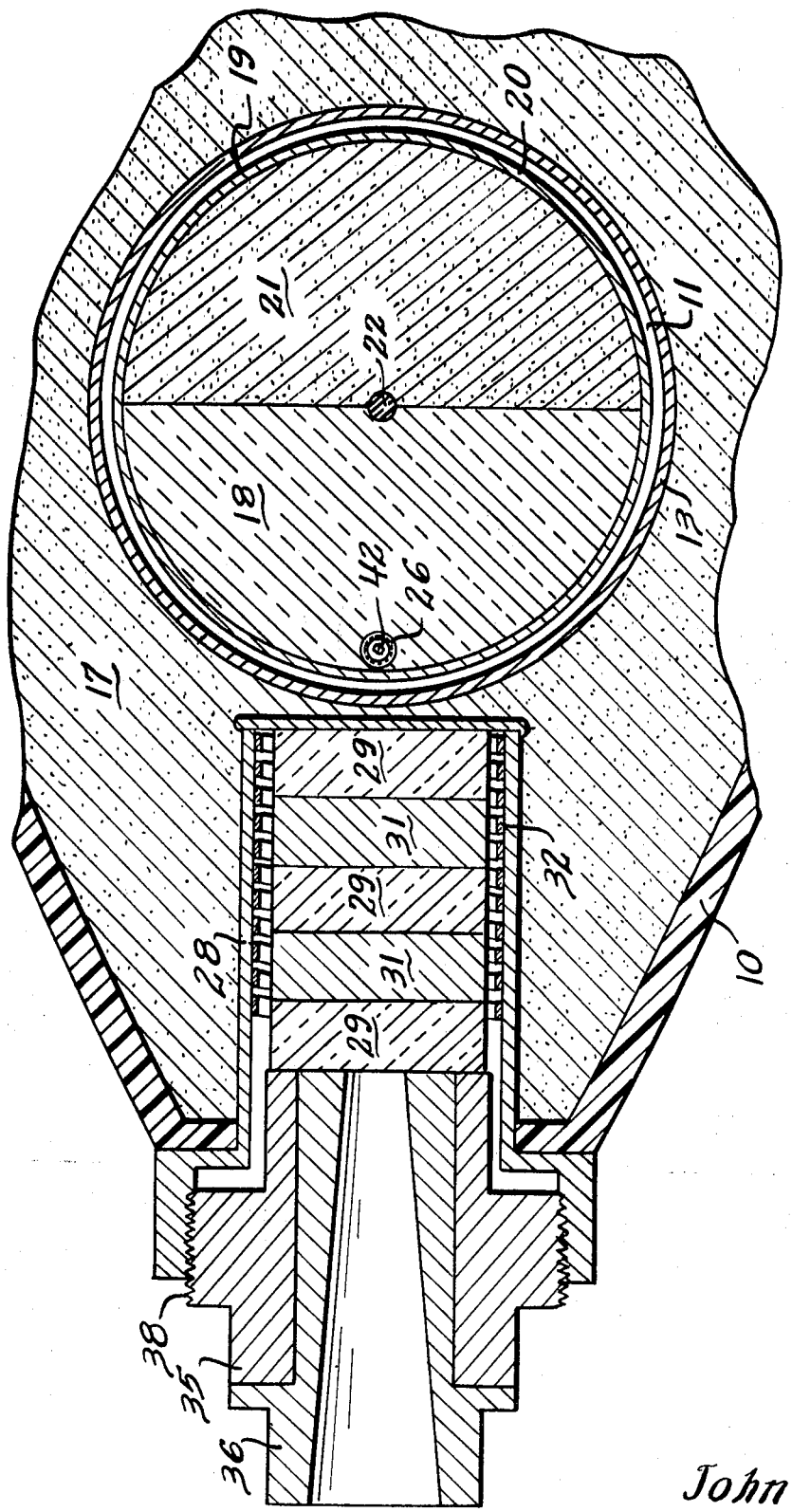

PORTABLE NEUTRON SOURCE USING A PLURALITY OF MODERATING MEANS

CONTRACTUAL ORIGIN OF THE INVENTION

The invention described herein was made in the course of, or under, a contract with the United States Atomic Energy Commission.

BACKGROUND OF THE INVENTION

This invention relates to a portable neutron source particularly suited for use in neutron radiography. Because the differences in neutron interactions as compared to the absorption characteristics of X and gamma rays, neutron radiography is useful in areas where X-ray and gamma-ray radiography are not amenable. For example, neutron radiography can be applied advantageously to the examination of the lighter elements, composite structures, rocket propellants, aircraft components, electronic hardware, biological specimens and radioactive specimens. Neutrons may be utilized to differentiate qualitatively between elements which may be closely related as far as their X-ray absorption characteristics are concerned. For example, drugs and narcotics produce recognizable pictures when neutrons are used for radiography while X-rays do not distinguish between drugs and many other common light element materials. Thus neutron radiography could be used by customs for examination of suitcases for drugs without the knowledge of the owner of the suitcase.

In order for neutron radiography to be more widely used, a portable neutron source is required. At present neutron radiography is carried out with fixed sources such as a reactor or with semi-permanent sources which can be relocated with difficulty. These sources are large, heavy and expensive. They are not adapted to be moved readily to a new location or to be used at temporary locations. It is also desirable to be able to vary the neutron spectra easily so that radiography of different materials can be carried out at a desired wave length.

It is therefore an object of this invention provide an improved neutron source.

Another object of this invention is to provide a neutron source which is relatively lightweight and compact.

Another object of this invention is to provide a portable neutron source having a variable neutron spectrum.

SUMMARY OF THE INVENTION

In practicing this invention a portable neutron source is provided in the form of an enclosure made of neutron-shielding material surrounding an interior portion. An opening in the neutron-shielding material leads from the interior portion to the outside of the enclosure. Neutron-moderating material is positioned in the opening for moderating the energy of neutrons passing from the interior portion to the outside of the enclosure.

An isotope-supporting structure is contained within the interior portion. This structure is rotatable about an axis extending through the source. A neutron-emitting isotope is positioned on one side of the axis of rotation and neutron-shielding material is positioned on the other side of the axis. The structure has a first position with the isotope opposite the neutron-moderating material and a second position with neutron-shielding material between the isotope and the neutron-moderating material. The neutron-shielding material blocks neutrons from the isotope from reaching the neutron-moderating material. A motor drive mechanism is used to rotate the source-supporting structure to the desired position.

The spectra of the source can be varied by changing the thickness of the moderating material and/or the composition of the moderating material. The spectra can also be changed by heating or cooling the moderating material. $^{252}$Cf is an example of a source isotope and $ZrH_2$, $BeH_2$ and $TiH_2$ are examples of moderating materials. $B_4C$ plus epoxy resin is an example of a shielding material.

DETAILED DESCRIPTION OF THE INVENTION

Referring to FIGS. 1 and 2, there is shown plan and elevation views of the neutron source. The source includes an enclosure 9 which may be formed of a fiber glass shell 10 which is light and strong with good neutron-shielding characteristics. A cylindrical interior portion 11 is formed by aluminum walls 13. The interior portion 11 is positioned by hollow tubes 14. Trunnion shafts 16 support the fiber glass shell 10 and may be supported by bearings (not shown) to permit rotation of the enclosure 10.

The space 17 between the fiber glass shell 10 and interior portion 11 is filled with a neutron-shielding material. The shielding material may be, for example, $B_4C$ (boron carbide) in an epoxy resin. The epoxy resin acts to thermalize the fast neutrons from the source and the boron captures the thermal neutrons. The boron carbide — epoxy mixture is contained in plastic bags which are packed into the shielding space 17. The boron carbide — epoxy mixture provides the same amount of shielding as approximately twice the volume of water or paraffin.

A cylinder 19 formed with aluminum walls 20 is positioned within interior portion 11 by shaft 22. Shaft 22 extends through hollow tubes 14 and is connected to a motor 23 at one end and a handle 25 at the other. Cylinder 19 can be rotated by either the handle 25 or the motor 23.

An aluminum tube 26 is positioned against one wall of the cylinder 19 to hold the neutron source. The portion 18 of the cylinder between the shaft 22 and tube 26 is filled with a neutron moderator and the rest of the cylinder 21 is filled with neutron-shielding material.

At the front of the enclosure 10 there is positioned a moderator holder 28 in which is placed disks of moderating material 29. The moderating material 29 may, for example, be in the form of disks 4 inches in diameter and one-fourth inch thick. Brass cooling plates 31 may be inserted between the moderating disks 29 if desired, or only moderating disks may be used. A heating coil 32 may be wrapped around the moderating disks 29. This coil is connected to a power supply 30 which furnishes the electrical power for coil 32. A strap of brass material 34 in contact with the brass disks leads out of the neutron source enclosure 10. The end of the strap may be cooled (or heated) to adjust the temperature of the moderating disks 29 as desired. For example, the strap 34 may be inserted in a Dewar 33 of liquid nitrogen to cool the moderating disks 29. The Dewar could be replaced by a heating coil or other heating means.

The moderating disks 29 and brass disks 31 are held in place by collimator holder 35. Collimator holder 35 has a conically shaped collimator 36 positioned inside. The collimator holder 35 has a threaded portion 38 which screws into moderator holder 28 to hold moderator disks 29 and brass disks 31 in position.

A radioactive isotope is used as the source of neutrons and is positioned in tube 26. Referring to FIG. 3, there is shown a cross-sectional view of the tube 26 and the isotope holder 41 positioned therein. A capsule 42 containing the isotope 44 is screwed into the isotope holder 41. The isotope holder 41 is inserted into tube 26 through tube 45 (FIG. 2). A plug 46 closes tube 45 when the isotope holder 41 is in place in tube 26. For example, a suitable isotope for use as a neutron source is $^{252}$Cf.

In operation, neutrons from the isotope pass through the moderator and collimator and are used as desired. The number and thickness of the moderator disks 29 can be varied to change the energy distribution of the neutrons emitted. The energy can also be changed by heating or cooling the brass disks 31 which in turn regulate the temperature of the moderating material 29. For example, the moderating materials which are useful in this device and which can withstand the temperatures used to obtain the desired neutron spectrum are $ZiH_2$, $BeH_2$ and $TiH_2$. The moderating disks 29 can be made exclusively of one or more of the above materials or can be made with these materials in combination with other materials.

When it is desired to turn off the neutron source, the cylinder 19 is rotated 180° to the position shown in FIG. 4 to position the shielding material 21 between the isotope 44 and the moderating disks 29. The shielding material 21 blocks the neutrons, effectively "turning off" the neutron source. Cylinder 19 is turned by motor 23 or handle 25 as desired.

The embodiments of the invention in which an exclusive property or privilege is claimed are defined as follows:

1. A neutron source for neutron radiography, including in combination, an enclosure formed of neutron-shielding material surrounding an interior portion, said enclosure further having an opening in said neutron-shielding material of said enclosure leading from said interior portion to the outside of said enclosure, neutron-moderating material positioned in said opening whereby neutrons can pass from said interior portion to the outside of said enclosure only through said neutron-moderating material, said neutron-moderating material being formed of a plurality of sections and further having temperature-controlling means thermally coupled to said neutron-moderating material for providing temperature control thereof, said enclosure including means for changing the number of said plurality of neutron-moderating material sections, whereby the thickness of said neutron-moderating material is varied, a rotatable structure positioned within said interior portion and having an axis about which said rotation takes place, said rotatable structure having a neutron-emitting isotope positioned on one side of said axis and neutron-shielding material positioned on the opposite side of said axis, said rotatable structure having a first position with said isotope positioned so that neutrons emitted thereby can enter said neutron-moderating material, said rotatable structure further having a second position with said neutron-shielding material positioned between said isotope and said neutron-moderating material, whereby neutrons from said isotope are blocked from said neutron-moderating material, and means coupled to said structure for rotating the same to a desired one of said first and second positions.

2. The neutron source of claim 1 wherein, said temperature-controlling means includes a plurality of metal sections interleaved with said plurality of neutron-moderating material sections, a heat sink, and thermally conductive means coupling said heat sink and said plurality of metal sections.

3. The neutron source of claim 1 wherein, said temperature-controlling means includes a plurality of metal sections interleaved with said plurality of neutron-moderating material sections, a heat source, and thermally conductive means coupling said heat source and said plurality of metal sections.

4. The neutron source of claim 1 wherein, said temperature-controlling means includes a heating element positioned around said plurality of neutron-moderating material sections.

5. The neutron source of claim 1 wherein, said isotope is $^{252}$Cf.

6. The neutron source of claim 2 wherein, at least a portion of said neutron-moderating material is $ZiH_2$ or $BeH_2$ or $TiH_2$.

7. The neutron source of claim 6 wherein, said neutron-shielding material of said enclosure and said rotatable structure is $B_4C$ and epoxy resin.

* * * * *